US012600199B2

(12) United States Patent
Jeong

(10) Patent No.: US 12,600,199 B2
(45) Date of Patent: Apr. 14, 2026

(54) HEAT PUMP SYSTEM FOR A VEHICLE

(71) Applicants: HYUNDAI MOTOR COMPANY,
Seoul (KR); KIA CORPORATION,
Seoul (KR)

(72) Inventor: Seong-Bin Jeong, Hwaseong-si (KR)

(73) Assignees: HYUNDAI MOTOR COMPANY,
Seoul (KR); KIA CORPORATION,
Seoul (KR)

( * ) Notice: Subject to any disclaimer, the term of this
patent is extended or adjusted under 35
U.S.C. 154(b) by 120 days.

(21) Appl. No.: 18/794,423

(22) Filed: Aug. 5, 2024

(65) Prior Publication Data

US 2025/0187404 A1     Jun. 12, 2025

(30) Foreign Application Priority Data

Dec. 12, 2023     (KR) ........................ 10-2023-0179247

(51) Int. Cl.
  *B60H 1/32*        (2006.01)
  *B60H 1/00*        (2006.01)
(52) U.S. Cl.
  CPC ....... *B60H 1/3228* (2019.05); *B60H 1/00321*
    (2013.01); *B60H 2001/3286* (2013.01)

(58) Field of Classification Search
  CPC ............ B60H 1/00271; B60H 1/00914; B60H
    1/00921; B60H 1/3228; B60H 1/00321;
    B60H 2001/3286; F25B 2400/054
  See application file for complete search history.

(56) References Cited

U.S. PATENT DOCUMENTS

| | | | | |
|---|---|---|---|---|
| 8,215,432 | B2 * | 7/2012 | Nemesh .............. | H01M 16/006 |
| | | | | 429/62 |
| 2022/0266651 | A1 * | 8/2022 | Jeong ................... | B60H 1/2221 |
| 2022/0410663 | A1 * | 12/2022 | Kim ..................... | B60H 1/3227 |
| 2023/0040535 | A1 * | 2/2023 | Song ................... | B60H 1/3211 |
| 2023/0373272 | A1 * | 11/2023 | Hötzel .............. | B60H 1/00485 |

* cited by examiner

*Primary Examiner* — Frantz F Jules
(74) *Attorney, Agent, or Firm* — Lempia Summerfield
Katz LLC

(57) ABSTRACT

A heat pump system for a vehicle includes a compressor, a
heating, ventilation, and air conditioning (HVAC) module, a
heat-exchanger, a first expansion valve, a first connection
line, a second expansion valve, and a heat-exchange module.
The heat exchange module is configured to exchange heat
between a coolant and a refrigerant, and to exchange heat
between a high-temperature refrigerant and a low-tempera-
ture refrigerant.

14 Claims, 2 Drawing Sheets

FIG. 1

HEAT PUMP SYSTEM FOR A VEHICLE

CROSS-REFERENCE TO RELATED APPLICATION

This application claims priority to and the benefit of Korean Patent Application No. 10-2023-0179247 filed in the Korean Intellectual Property Office on Dec. 12, 2023, the entire contents of which are incorporated herein by reference.

BACKGROUND

(a) Field of the Disclosure

The present disclosure relates to a heat pump system for a vehicle. More particularly, the present disclosure relates to a heat pump system for a vehicle employing one heat-exchanger module capable of exchanging heat between a refrigerant and a coolant and exchanging heat between low-temperature and high-temperature refrigerants.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by driving a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Recently, in accordance with a continuous increased interest in energy efficiency and environmental pollution, the development of an environmentally-friendly vehicle capable of substantially substituting for an internal combustion engine vehicle is desired. Environmentally-friendly vehicles are classified into electric vehicles driven using a fuel cell or electricity as a power source and hybrid vehicles driven using an engine and a battery.

Among these environmentally-friendly vehicles, a separate heater is not used unlike an air conditioner of a general vehicle. Additionally, an air conditioner used in the environmentally-friendly vehicles is generally called a heat pump system.

The electric vehicle driven by the power source of the fuel cell generates driving force by converting chemical reaction energy between oxygen and hydrogen into electrical energy. In this process, heat energy is generated by a chemical reaction in a fuel cell. Therefore, it is advantageous to secure performance of the fuel cell to effectively remove generated heat.

In addition, the hybrid vehicle generates driving force by driving a motor using electricity supplied from the fuel cell described above or an electrical battery, together with an engine operated by a fossil fuel. Therefore, heat generated from the fuel cell or the battery and the motor should be effectively removed in order to secure performance of the motor.

Therefore, in the hybrid vehicle or the electric vehicle according to the related art, a cooling means, a heat pump system, and a battery cooling system, respectively, should be configured as separate closed circuits so as to prevent heat generation of the motor, an electric component, and the battery including a fuel cell.

Therefore, the size and weight of a cooling module disposed at the front of the vehicle are increased. Also, a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain optimal performance of the battery, a plurality of valves for selectively interconnecting connections pipes are employed. Thus, noise and vibration due to frequent opening and closing operations of the valves may be introduced into the vehicle interior, thereby deteriorating the ride comfort.

In addition, when heating the vehicle interior, the heating performance may deteriorate due to the lack of a heat source, the electricity consumption may be increased due to the usage of the electric heater, and the power consumption of the compressor may be increased.

The above information disclosed in this Background section is only to enhance understanding of the background of the disclosure. Therefore, the Background section may contain information that does not form the prior art that is already known to a person of ordinary skill in the art.

SUMMARY

The present disclosure provides a heat pump system for a vehicle designed to reduce the number of components and thereby reduce manufacturing costs. This is achieved by employing a single heat-exchanger module configured to exchange heat between a refrigerant and a coolant, and exchange heat between a low-temperature refrigerant and a high-temperature refrigerant.

A heat pump system for a vehicle may include a compressor configured to compress a refrigerant and a heating, ventilation, and air conditioning (HVAC) module. The HVAC module includes an internal condenser, an evaporator connected to the compressor via a refrigerant line, and an opening/closing door configured to adjust an air having passed via the evaporator to selectively flow into the internal condenser, depending on a cooling mode or a heating mode of the vehicle. The heat pump system also includes a heat-exchanger connected to the internal condenser via the refrigerant line and a first expansion valve provided on the refrigerant line between the heat-exchanger and the evaporator. The system also includes a first connection line having a first end connected to the refrigerant line between the heat-exchanger and the first expansion valve and having a second end connected to the refrigerant line between the evaporator and the compressor. The system also includes a second expansion valve provided on the first connection line and includes a heat-exchanger module. The heat-exchanger module may be connected to the first connection line and configured to exchange heat between a coolant selectively introduced via a coolant line and the refrigerant introduced via the first connection line. The heat-exchanger module may be further connected to the refrigerant line and configured to exchange heat between the refrigerant supplied from the internal condenser or the heat-exchanger and the refrigerant supplied from one of the evaporator or the first connection line.

The heat-exchanger module may include a chiller provided on the first connection line at a downstream end of the second expansion valve to allow the refrigerant to pass through. The chiller may be connected to a coolant circulation apparatus circulating the coolant via the coolant line. Additionally, the heat-exchanger module may include a sub-heat-exchanger integrally provided in the chiller and connected to the refrigerant line connecting the heat-exchanger and the first expansion valve and to the refrigerant line connecting the evaporator and the compressor, respectively.

The chiller may include a first heat-exchange unit configured to exchange heat between the coolant and the refrigerant. The chiller may also include a first refrigerant inlet disposed on a first side of the first heat-exchange unit and configured to receive the refrigerant from the second expansion valve. The chiller may also include a first refrigerant outlet disposed on a second side of the first heat-exchange unit and configured to discharge the refrigerant to the sub-heat-exchanger.

The heat-exchanger module may include a coolant inlet configured to flow the coolant into the first heat-exchange unit. The module may also include a first coolant outlet disposed at a location opposed to the coolant inlet and configured to discharge the coolant that has not passed through the first heat-exchange unit and may include a second coolant outlet disposed at a location spaced apart from the coolant inlet and configured to discharge the coolant having passed through the first heat-exchange unit.

The coolant inlet may be connected to a heating element via the coolant line flowing the coolant. The first coolant outlet may be connected to a radiator included in the coolant circulation apparatus via the coolant line. The second coolant outlet may be connected to a coolant valve included in the coolant circulation apparatus via the coolant line.

The chiller may be configured to recollect waste heat of the heating element and exchange heat between the coolant introduced into the first heat-exchange unit via the coolant line and the refrigerant or may cool the heating element by using the coolant having exchanged heat with the refrigerant.

The sub-heat-exchanger may include a second heat-exchange unit configured to exchange heat between a low-temperature refrigerant and a high-temperature refrigerant. The sub-heat exchanger unit may also include a second refrigerant inlet disposed on a first side of the second heat-exchange unit and configured to flow the high-temperature refrigerant supplied from one of the internal condenser and the heat-exchanger to the second heat-exchange unit. The sub-heat-exchanger may also include a second refrigerant outlet disposed in the second heat-exchange unit at a location spaced apart from the second refrigerant inlet and configured to discharge the refrigerant having passed through the second heat-exchange unit to the first expansion valve or the second expansion valve. The sub-heat-exchanger may also include a third refrigerant inlet disposed on a second side of the second heat-exchange unit and configured to flow the low-temperature refrigerant supplied from the evaporator into the second heat-exchange unit. The sub-heat-exchanger may also include a third refrigerant outlet disposed on the first side of the second heat-exchange unit at a location opposite to the third refrigerant inlet and configured to discharge the refrigerant having passed through the second heat-exchange unit.

The third refrigerant inlet may communicate with the first refrigerant outlet disposed in the chiller such that the refrigerant, having passed through the first heat-exchange unit, may be introduced into the second heat-exchange unit.

The refrigerant having passed through at least one of the evaporator and the chiller may be introduced into the second heat-exchange unit through the third refrigerant inlet.

A heat pump system may further include a second connection line having a first end connected to the second expansion valve and may include a second end connected to the refrigerant line between the internal condenser and the heat-exchanger. The heat pump system may include a third expansion valve provided on the refrigerant line between the internal condenser and the heat-exchanger and may include a third connection line having a first end connected to the third expansion valve and having a second end connected to the refrigerant line between the heat-exchanger and a sub-heat-exchanger.

The heat-exchanger may be configured to condensate or evaporate the refrigerant by exchanging heat with ambient air based on a selective operation of the third expansion valve.

The second expansion valve and the third expansion valve may be electronic expansion valves configured to selectively expand the refrigerant while controlling a flow of the supplied refrigerant.

A heat pump system may further include an accumulator provided on the refrigerant line between the evaporator and the compressor.

The heat-exchanger module may be a plate-type heat-exchanger.

As described above, according to a heat pump system for a vehicle according to an embodiment, by employing a single heat-exchanger module capable of exchanging heat between a refrigerant and a coolant and of exchanging heat between a low-temperature refrigerant and a high-temperature refrigerant, the number of employed components may be reduced or minimized. As a result, the entire heat pump system may be streamlined.

In addition, according to the present disclosure, by efficiently managing the temperature of the heating element including the electrical component and the battery module, the optimal performance of the electrical component and the battery module may be achieved. Additionally, through efficient management of the battery module, the overall driving distance of the vehicle may be increased.

In addition, according to the present disclosure, in the heating mode of vehicle interior, the ambient air heat and the waste heat of the heating element may be selectively used. Accordingly, the heating efficiency may be improved.

In addition, according to the present disclosure, by increasing sub-cooling of the refrigerant through the heat-exchanger module, the entire cooling performance and efficiency of the heat pump system may be improved.

In addition, according to an embodiment, it is possible to reduce manufacturing cost and weight through simplification of the entire heat pump system, thus improving space utilization.

BRIEF DESCRIPTION OF THE DRAWINGS

FIG. 1 is a block diagram of a heat pump system for a vehicle according to an embodiment.

DETAILED DESCRIPTION OF THE EMBODIMENTS

Figure 2:
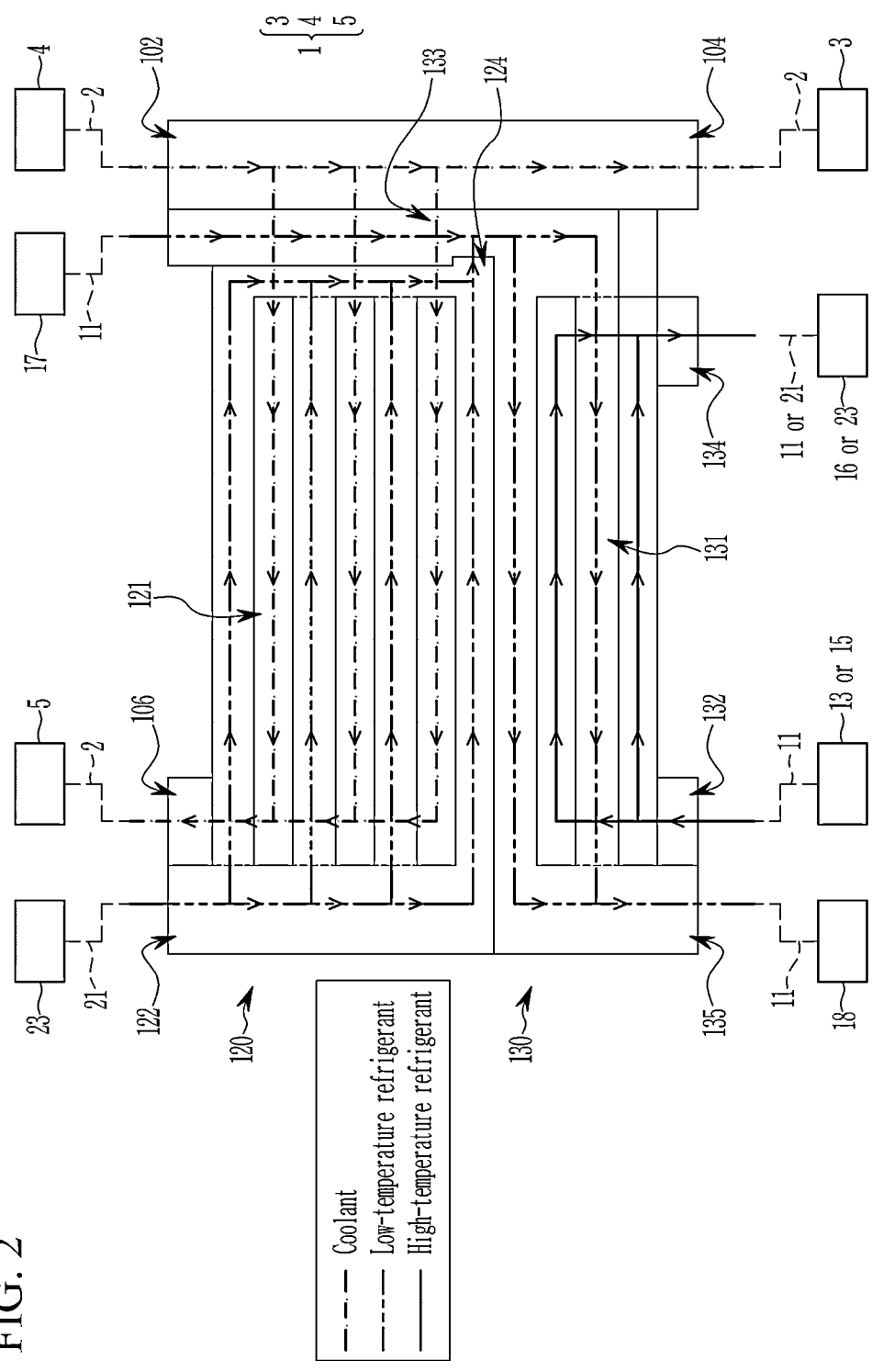
FIG. 2 is a schematic diagram of a heat-exchanger module applied to a heat pump system for a vehicle according to an embodiment.

Embodiments are hereinafter described in detail with reference to the accompanying drawings.

The embodiments disclosed in the present specification and the constructions depicted in the drawings are only example embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted. Also, the same elements or equivalents are referred to with the same reference numerals throughout the specification.

Also, the size and thickness of each element are arbitrarily shown in the drawings and thus the present disclosure is not necessarily limited thereto. Additionally, in the drawings, the thickness of layers, films, panels, regions, and the like, may be exaggerated for clarity.

In addition, unless explicitly described to the contrary, the terms "comprise" and variations such as "comprises" or "comprising", should be understood to imply the inclusion of stated elements but not the exclusion of any other elements. The same is true for terms such as "have," "include," and the like.

Furthermore, terms, such as " . . . unit", " . . . means", " . . . portions", " . . . part", and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or perform that operation or function.

Figure 1:
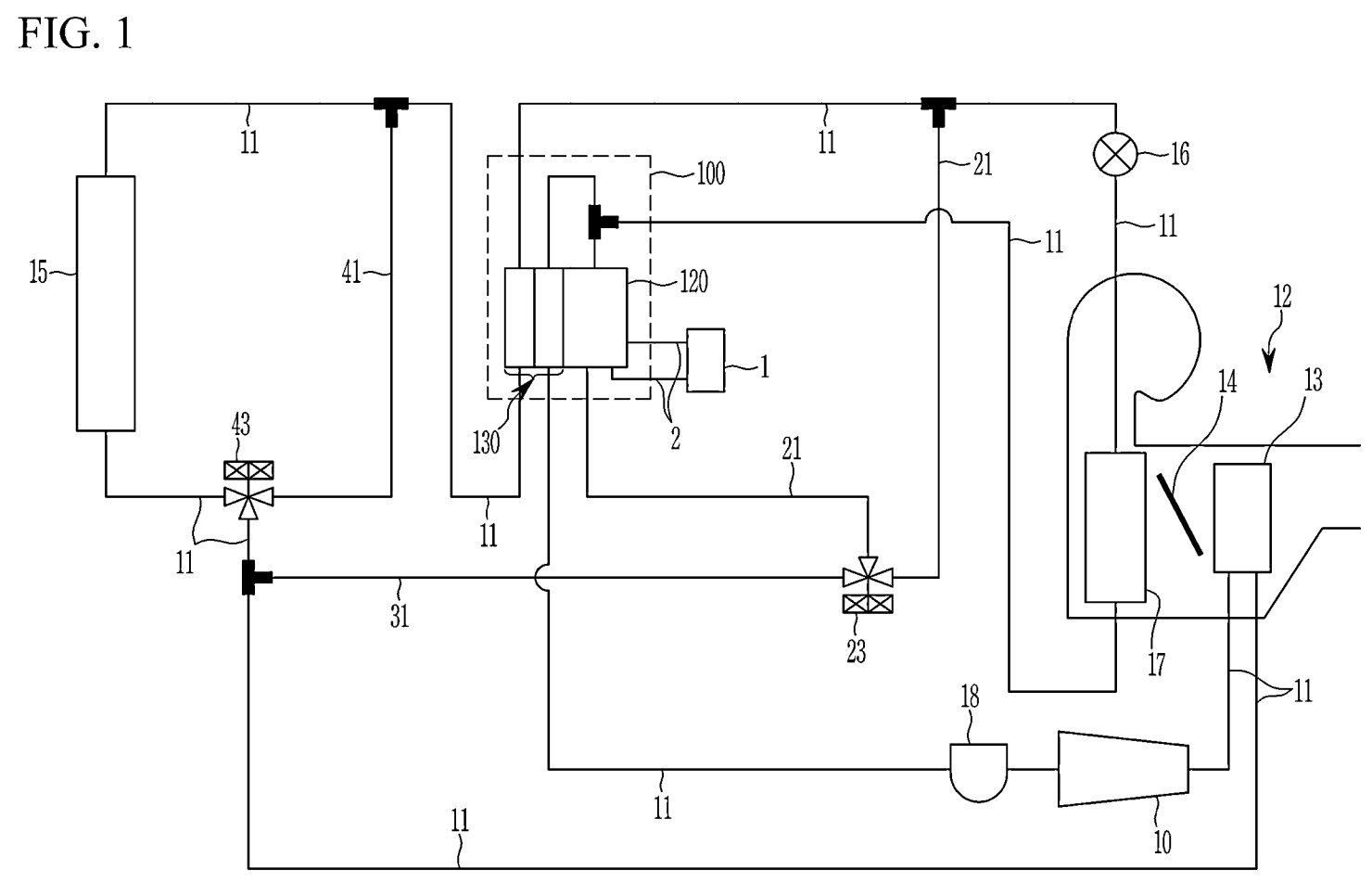

FIG. 1 is a block diagram of a heat pump system for a vehicle according to an embodiment.

A heat pump system for a vehicle according to an embodiment employs a single heat-exchanger module 100 configured to exchange heat between a refrigerant and a coolant. Additionally, the heat-exchanger module 100 is configured to exchange heat between a low-temperature and a high-temperature refrigerant. Thus, by employing a single heat-exchanger module 100, the number of employed components may be minimized or reduced, and the streamlining of the entire system may be achieved.

The heat-exchanger module 100 may be connected to a coolant circulation apparatus 1 circulating the coolant via a coolant line 2. The coolant circulation apparatus 1 may include a radiator 3, a heating element 4, and a coolant valve 5.

A water pump (not shown) may be provided on the coolant line 2. In other words, the coolant may circulate via the coolant line 2 according to an operation of a water pump (not shown).

The heating element 4 may include electrical components and a battery module. The electrical components may include a power control apparatus, an inverter, and/or an on-board charger (OBC).

Referring to FIG. 1, the heat pump system may include a compressor 10, a heating, ventilation, and air conditioning (HVAC) module 12, a heat-exchanger 15, a first expansion valve 16, an evaporator 17, a first connection line 21, a second expansion valve 23, and the heat-exchanger module 100.

First, the compressor 10 may compress the introduced refrigerant and flow the compressed refrigerant to the refrigerant line 11 such that the refrigerant may circulate along the refrigerant line 11.

The HVAC module 12 may be provided with an internal condenser 13 and the evaporator 17 connected via the refrigerant line 11.

An opening/closing door 14 configured to adjust ambient air having passed through the evaporator 17 to selectively flow into the internal condenser 13 may be provided inside the HVAC module 12 between the evaporator 17 and the internal condenser 13.

The opening/closing door 14 may be opened at the time of heating the vehicle interior such that the ambient air having passed through the evaporator 17 may be introduced into the internal condenser 13.

In other words, the high-temperature refrigerant supplied to the internal condenser 13 may increase the temperature of the ambient air passing through the internal condenser 13. In other words, the introduced ambient air may be converted to a high-temperature state while passing through the internal condenser 13 and then introduced into the vehicle interior, thereby implementing heating of the vehicle interior.

At the time of cooling the vehicle interior, the opening/closing door 14 may close a side to the internal condenser 13 such that the ambient air cooled while passing through the evaporator 17 may be directly introduced into the vehicle interior.

Accordingly, the ambient air passing through the evaporator 17 may be cooled while passing through the evaporator 17 by the low-temperature refrigerant supplied to the evaporator 17. The cooled ambient air may be introduced into the vehicle interior, and thereby the vehicle interior may be cooled.

In the present embodiment, the heat-exchanger 15 may be connected to the internal condenser 13 via the refrigerant line 11. The heat-exchanger 15 may be disposed in the front portion of the vehicle.

In other words, the heat-exchanger 15 may be an air-cooled heat-exchanger configured to exchange heat between the introduced refrigerant and the ambient air.

The first expansion valve 16 may be provided on the refrigerant line 11 connecting the heat-exchanger 15 and the evaporator 17. The first expansion valve 16 may selectively expand the introduced refrigerant.

The heat pump system may further include an accumulator 18 provided on the refrigerant line 11 between the evaporator 17 and the compressor 10. The accumulator 18 may supply only the gaseous refrigerant to the compressor 10, and thereby may improve the efficiency and durability of the compressor 10.

A first end of the first connection line 21 may be connected to the refrigerant line 11 between the heat-exchanger 15 and the first expansion valve 16. A second end of the first connection line 21 may be connected to the refrigerant line 11 between the evaporator 17 and the compressor 10.

In more detail, the second end of the first connection line 21 may be connected to the refrigerant line 11 between the evaporator and the accumulator 18.

In the present embodiment, the second expansion valve 23 may be provided on the first connection line 21. The second expansion valve 23 may be an electronic expansion valve configured to selectively expand the supplied refrigerant while controlling the flow of the refrigerant.

The heat-exchanger module 100 may be provided on the first connection line 21, at a downstream end of the second expansion valve 23.

The second expansion valve 23 may be disposed at an upstream end of the heat-exchanger module 100 based on the flow direction of the refrigerant flowing along the first connection line 21, such that the refrigerant may be introduced into the heat-exchanger module 100 before the refrigerant is supplied elsewhere.

The upstream end of the heat-exchanger module 100 may be set based on the flow direction of the refrigerant. Based on the direction in which the refrigerant flows along the first connection line 21, a location at which the refrigerant is introduced into the heat-exchanger module 100 may be defined as the upstream end of the heat-exchanger module 100, and a location at which the refrigerant is discharged from the heat-exchanger module 100 may be defined as a downstream end of the heat-exchanger module 100.

The heat-exchanger module 100 may be connected to the refrigerant line 11 connecting the heat-exchanger 15 and the first expansion valve 16 and the refrigerant line 11 connecting the evaporator 17 and the compressor 10, respectively.

In other words, the heat-exchanger module 100 may be connected to the first connection line 21 and configured to exchange heat between the coolant selectively introduced from the coolant circulation apparatus 1 and the refrigerant.

Simultaneously, the heat-exchanger module 100 may be connected to the refrigerant line 11 and configured to exchange heat between the refrigerant supplied from the internal condenser 13 or the heat-exchanger 15 and the refrigerant supplied from one of the evaporator 17 or the first connection line 21.

In the present embodiment, the heat pump system may further include a second connection line 31, a third connection line 41, and a third expansion valve 43.

A first end of the second connection line 31 may be connected to the second expansion valve 23. A second end of the second connection line 31 may be connected to the refrigerant line 11 between the internal condenser 13 and the heat-exchanger 15.

The second connection line 31 configured as such may be opened by an operation of the second expansion valve 23, in a heating and dehumidification mode of the vehicle interior. When the second connection line 31 is opened, a partial refrigerant among the refrigerant discharged from the internal condenser 13 may be introduced into the second connection line 31.

At this time, the second expansion valve 23 may expand the refrigerant introduced via the second connection line 31 and flow the expanded refrigerant into the heat-exchanger module 100.

In the present embodiment, the third expansion valve 43 may be provided on the refrigerant line 11 between the internal condenser 13 and the heat-exchanger 15. The third expansion valve 43 may be an electronic expansion valve configured to selectively expand the supplied refrigerant while controlling the flow of the refrigerant.

The heat-exchanger 15 may condense or evaporate the refrigerant through heat-exchange with the ambient air according to a selective operation of the third expansion valve 43.

In other words, for heating the vehicle interior, when the refrigerant expanded by the operation of the third expansion valve 43 is introduced, the heat-exchanger 15 may recollect the ambient air heat while exchanging heat between the refrigerant and the ambient air.

A first end of the third connection line 41 may be connected to the third expansion valve 43. A second end of the third connection line 41 may be connected to the refrigerant line 11 between the heat-exchanger 15 and the heat-exchanger module 100.

The third connection line 41 configured as such may be opened by the operation of the third expansion valve 43, in the heating and dehumidification mode or the heating and defrosting mode of the vehicle interior. The defrosting mode may be operated when frost occurs in the heat-exchanger 15.

In other words, when the third connection line 41 is opened, the heat-exchanger 15 may not receive the refrigerant but may receive a remaining refrigerant excluding the refrigerant introduced into the second connection line 31 from among the refrigerant discharged from the internal condenser 13.

The detailed structure and connection configuration of the heat-exchanger module 100 in the heat pump system configured as such is described in detail with reference to FIG. 2.

FIG. 2 is a schematic diagram of a heat-exchanger module applied to a heat pump system for a vehicle according to an embodiment.

Referring to FIG. 2, the heat-exchanger module 100 may include a chiller 120 and a sub-heat-exchanger 130.

First, the chiller 120 may be provided on the first connection line 21, at the downstream end of the second expansion valve 23 to allow the refrigerant to pass through and may be connected to the coolant circulation apparatus 1 via the coolant line 2.

Accordingly, the coolant may selectively circulate through an interior of the chiller 120.

The chiller 120 may include a first heat-exchange unit 121, a first refrigerant inlet 122, and a first refrigerant outlet 124.

First, the first heat-exchange unit 121 may exchange heat between the coolant introduced from the heating element 4 of the coolant circulation apparatus 1 via the coolant line 2 and the refrigerant introduced via the first connection line 21.

The first heat-exchange unit 121 may be formed by stacking a plurality of plates, such that fluid lines configured to flow the refrigerant and the coolant, respectively, may be alternately disposed therein. Accordingly, the refrigerant and the coolant may exchange heat with each other while passing through different fluid lines.

The first refrigerant inlet 122 may be formed or disposed on a first side of the first heat-exchange unit 121. The first refrigerant inlet 122 may receive the refrigerant from the second expansion valve 23.

In addition, the first refrigerant outlet 124 may be formed or disposed at an opposite side of the first refrigerant inlet 122, on a second side of the first heat-exchange unit 121. The first refrigerant outlet 124 may discharge the refrigerant to the sub-heat-exchanger 130.

The heat-exchanger module 100 may further include a coolant inlet 102, a first coolant outlet 104, and a second coolant outlet 106.

First, the coolant inlet 102 may flow the coolant into the first heat-exchange unit 121.

The coolant inlet 102 may be connected to the heating element 4 via the coolant line 2 configured to flow the coolant.

The first coolant outlet 104 may be disposed at a location opposed to the coolant inlet 102. The first coolant outlet 104 may discharge the coolant that has not passed through the first heat-exchange unit 121.

The first coolant outlet 104 may be connected to the radiator 3, which is included in the coolant circulation apparatus 1, via the coolant line 2.

In addition, the second coolant outlet 106 may be formed or disposed at a location spaced apart from the coolant inlet 102 to discharge the coolant having passed through the first heat-exchange unit 121.

The second coolant outlet 106 may be connected to the coolant valve 5 that is included in the coolant circulation apparatus 1 via the coolant line 2.

Accordingly, the refrigerant introduced via the first connection line 21 may be introduced into the first heat-exchange unit 121 through the first refrigerant inlet 122. At the same time, the coolant introduced from the heating element 4 via the coolant line 2 may be introduced into the first heat-exchange unit 121 through the coolant inlet 102.

The refrigerant and the coolant may flow in opposite directions within the first heat-exchange unit 121. In other words, the chiller 120 may exchange heat between the refrigerant and the coolant by flowing them in counterflow directions.

The chiller 120 configured as such may adjust a temperature of the coolant by exchanging heat between the refrigerant introduced into the first connection line 21 and the coolant that is selectively introduced. In more detail, the chiller 120 may exchange heat between the supplied refrigerant and the coolant to adjust the temperature of the coolant.

The chiller 120 may be a water-cooled heat-exchanger that exchanges heat between the interiorly introduced refrigerant and the coolant.

In other words, the chiller 120 may exchange heat between the coolant selectively introduced via the coolant line 2 and the selectively supplied refrigerant to adjust the temperature of the coolant. The coolant having exchanged heat at the chiller 120 may circulate to the heating element 4 through the coolant valve 5 provided on the coolant line 2.

Accordingly, the coolant having exchanged heat with the refrigerant at the chiller 120 may adjust the temperature of the electrical component and the battery module included in the heating element 4, while being selectively supplied to the heating element 4.

In other words, in a heating mode, a heating and dehumidification mode, a heating and defrosting mode of the vehicle interior, or a heating and dehumidification mode of the vehicle interior, the coolant may circulate via the coolant line 2 such that the coolant having passed through the heating element 4 may be supplied to the chiller 120.

The defrosting mode may be operated when frost occurs in the heat-exchanger 15.

The chiller 120 configured as such may recollect a waste heat of the heating element 4 while exchanging heat between the coolant introduced via the coolant line 2 and the refrigerant or cool the heating element 4 by using the coolant having exchanged heat with the refrigerant.

In addition, the sub-heat-exchanger 130 may be integrally provided in the chiller 120. The sub-heat-exchanger 130 may be connected to the refrigerant line 11 connecting the heat-exchanger 15 and the first expansion valve 16 and the refrigerant line 11 connecting the evaporator 17 and the compressor 10, respectively.

The sub-heat-exchanger 130 may exchange heat between the refrigerant having passed through the internal condenser

13 or the heat-exchanger 15 and the refrigerant having passed through at least one of the evaporator 17, and the chiller 120 with each other, such that the condensation level may be increased by increasing sub-cooling of the refrigerant.

The sub-heat-exchanger 130 may include a second heat-exchange unit 131, a second refrigerant inlet 132, a third refrigerant inlet 133, a second refrigerant outlet 134, and a third refrigerant outlet 135.

First, the second heat-exchange unit 131 may exchange heat between the interiorly introduced low-temperature refrigerant and the high-temperature refrigerant.

The second heat-exchange unit 131 may be formed by stacking the plurality of plates, such that fluid lines configured to flow the high-temperature refrigerant and the low-temperature refrigerant, respectively, may be alternately disposed therein. Accordingly, the high-temperature refrigerant and the low-temperature refrigerant may exchange heat with each other while passing through different fluid lines.

In other words, the heat-exchanger module 100 may be a plate-type heat-exchanger. The heat exchanger module 100 may be formed by stacking a plurality of plates and configured to form the chiller 120 and the sub-heat-exchanger 130.

In the present embodiment, the second refrigerant inlet 132 may be formed or disposed on a first side of the second heat-exchange unit 131. The second refrigerant inlet 132 may flow the high-temperature refrigerant supplied from one of the internal condenser 13 and the heat-exchanger 15 to the second heat-exchange unit 131.

The third refrigerant inlet 133 may be formed or disposed on a second side of the second heat-exchange unit 131. The third refrigerant inlet 133 may flow the low-temperature refrigerant supplied from the evaporator 17 into the second heat-exchange unit 131.

The third refrigerant inlet 133 may communicate with the first refrigerant outlet 124 disposed in the chiller 120 such that the refrigerant having passed through the first heat-exchange unit 121 may be introduced into the second heat-exchange unit 131.

Accordingly, the refrigerant having passed through the at least one of the evaporator 17 and the chiller 120 may be introduced into the second heat-exchange unit 131 through the third refrigerant inlet 133.

In the present embodiment, the second refrigerant outlet 134 may be formed or disposed in the second heat-exchange unit 131, at a location spaced apart from the second refrigerant inlet 132. The second refrigerant outlet 134 may discharge the refrigerant having passed through the second heat-exchange unit 131 to the first expansion valve 16 or the second expansion valve 23.

In addition, the third refrigerant outlet 135 may be formed or disposed on the first side of the second heat-exchange unit 131, at a location opposite to the third refrigerant inlet 133. The third refrigerant outlet 135 may discharge the refrigerant having passed through the second heat-exchange unit 131.

The high-temperature refrigerant discharged from the internal condenser 13 or the heat-exchanger 15 may be introduced into the second heat-exchange unit 131 through the second refrigerant inlet 132. In addition, the low-temperature refrigerant discharged from one or all of the evaporator 17 and the chiller 120 may be introduced into the second heat-exchange unit 131 through the third refrigerant inlet 133.

The high-temperature refrigerant and the low-temperature refrigerant may flow in opposite directions within the second heat-exchange unit 131. In other words, the sub-heat-exchanger 130 may exchange heat between the high-temperature refrigerant and the low-temperature refrigerant by flowing them in counterflow directions.

In the heat pump system provided with the heat-exchanger module 100 configured as such, the refrigerant discharged from one or all of the evaporator 17 and the chiller 120 may exchange heat with the refrigerant supplied from the internal condenser 13 or the heat-exchanger 15 at the sub-heat-exchanger 130, and then may be supplied to the compressor 10.

In other words, the high-temperature refrigerant discharged from the internal condenser 13 or the heat-exchanger 15 and the low-temperature refrigerant discharged from one or all of the evaporator 17 and the chiller 120 may be introduced into the sub-heat-exchanger 130, respectively.

Accordingly, the sub-heat-exchanger 130 may additionally exchange heat between the low-temperature refrigerant and the high-temperature refrigerant to further lower the temperature of the refrigerant and to increase the condensation level.

As such, the sub-heat-exchanger 130 may further condense the refrigerant condensed at the internal condenser 13 or the heat-exchanger 15 to increase sub-cooling of the refrigerant. Accordingly, a coefficient of performance (COP), which is a coefficient of cooling capability compared to a required compressor power, may be improved.

Therefore, as described above, when a heat pump system for a vehicle according to an embodiment is applied, by employing a single heat-exchanger module 100 configured to exchange heat between the refrigerant and the coolant and exchange heat between the low-temperature refrigerant and the high-temperature refrigerant, the number of employed components may be reduced or minimized. As a result, the entire heat pump system may be streamlined.

In addition, according to the present disclosure, by efficiently managing the temperature of the heating element 4, including the electrical component and the battery module, by using the heat-exchanger module 100, the optimal performance of the electrical component and the battery module may be achieved. Additionally, through efficient management of the battery module, the overall driving distance of the vehicle may be increased.

In addition, according to the present disclosure, in the heating mode of the vehicle interior, by selectively using the ambient air heat and the waste heat of the heating element 4, the heating efficiency may be improved.

In addition, according to the present disclosure, by increasing the sub-cooling of the refrigerant through the heat-exchanger module 100, the entire cooling performance and efficiency of the heat pump system may be improved.

In addition, according to the present disclosure, by streamlining the entire heat pump system, it is possible to reduce manufacturing cost and weight and to improve space utilization.

While this disclosure has been described in connection with what is presently considered to be practical embodiments, it is to be understood that the disclosure is not limited to the disclosed embodiments. On the contrary, the disclosure is intended to cover various modifications and equivalent arrangements included within the spirit and scope of the appended claims.

DESCRIPTION OF SYMBOLS

1: coolant circulation apparatus
2: coolant line
4: heating element
5: coolant valve
10: compressor
11: refrigerant line
12: HVAC module
13: internal condenser
14: opening/closing door
15: heat-exchanger
16: first expansion valve
17: evaporator
18: accumulator
21: first connection line
23: second expansion valve
31: second connection line
41: third connection line
43: third expansion valve
100: heat-exchanger module
102: coolant inlet
104, 106: first and the second coolant outlets
120: chiller
121: first heat-exchange unit
122: first refrigerant inlet
124: first refrigerant outlet
130: sub-heat-exchanger
131: second heat-exchange unit
132, 133: second and third refrigerant inlets
134, 135: second and third refrigerant outlets

What is claimed is:

1. A heat pump system for a vehicle, comprising:
a compressor configured to compress a refrigerant;
a heating, ventilation, and air conditioning (HVAC) module including an internal condenser, an evaporator connected to the compressor via a refrigerant line, and an opening/closing door configured to adjust air having passed through the evaporator to selectively flow into the internal condenser, depending on a cooling mode or a heating mode of the vehicle;
a heat-exchanger connected to the internal condenser via the refrigerant line;
a first expansion valve provided on the refrigerant line between the heat-exchanger and the evaporator;
a first connection line having a first end connected to the refrigerant line between the heat-exchanger and the first expansion valve and having a second end connected to the refrigerant line between the evaporator and the compressor;
a second expansion valve provided on the first connection line; and
a heat-exchanger module connected to the first connection line and configured to exchange heat between a coolant selectively introduced via a coolant line and the refrigerant introduced via the first connection line, wherein the heat-exchanger module is connected to the refrigerant line and configured to exchange heat between the refrigerant supplied from one of the internal condenser or the heat-exchanger and the refrigerant supplied from one of the evaporator or the first connection line.

2. The heat pump system of claim 1, wherein the heat-exchanger module comprises:
a chiller provided on the first connection line at a downstream end of the second expansion valve to allow the refrigerant to pass through, the chiller connected to a coolant circulation apparatus circulating the coolant via the coolant line; and
a sub-heat-exchanger integrally provided in the chiller and connected to the refrigerant line connecting the heat-exchanger and the first expansion valve and to the refrigerant line connecting the evaporator and the compressor, respectively.

3. The heat pump system of claim 2, wherein the chiller comprises:

a first heat-exchange unit configured to exchange heat between the coolant and the refrigerant;

a first refrigerant inlet disposed on a first side of the first heat-exchange unit and configured to receive the refrigerant from the second expansion valve; and a first refrigerant outlet disposed on a second side of the first heat-exchange unit and configured to discharge the refrigerant to the sub-heat-exchanger.

4. The heat pump system of claim 3, wherein the heat-exchanger module comprises:

a coolant inlet configured to flow the coolant into the first heat-exchange unit;

a first coolant outlet disposed at a location opposed to the coolant inlet and configured to discharge the coolant that has not passed through the first heat-exchange unit; and a second coolant outlet disposed at a location spaced apart from the coolant inlet and configured to discharge the coolant having passed through the first heat-exchange unit.

5. The heat pump system of claim 4, wherein:

the coolant inlet is connected to a heating element via the coolant line flowing the coolant;

the first coolant outlet is connected to a radiator included in the coolant circulation apparatus via the coolant line; and the second coolant outlet is connected to a coolant valve comprised in the coolant circulation apparatus via the coolant line.

6. The heat pump system of claim 5, wherein the chiller is configured to recollect a waste heat of the heating element and exchange heat between the coolant introduced into the first heat-exchange unit via the coolant line and the refrigerant, or to cool the heating element by using the coolant having exchanged heat with the refrigerant.

7. The heat pump system of claim 3, wherein the sub-heat-exchanger comprises:

a second heat-exchange unit configured to exchange heat between a low-temperature refrigerant and a high-temperature refrigerant;

a second refrigerant inlet disposed on a first side of the second heat-exchange unit and configured to flow the high-temperature refrigerant supplied from one of the internal condenser or the heat-exchanger to the second heat-exchange unit;

a second refrigerant outlet disposed in the second heat-exchange unit at a location spaced apart from the second refrigerant inlet and configured to discharge the refrigerant having passed through the second heat-exchange unit to the first expansion valve or the second expansion valve;

a third refrigerant inlet disposed on a second side of the second heat-exchange unit and configured to flow the low-temperature refrigerant supplied from the evaporator into the second heat-exchange unit; and a third refrigerant outlet disposed on the first side of the second heat-exchange unit at a location opposite to the third refrigerant inlet and configured to discharge the refrigerant having passed through the second heat-exchange unit.

8. The heat pump system of claim 7, wherein the third refrigerant inlet communicate with the first refrigerant outlet disposed in the chiller such that the refrigerant having passed through the first heat-exchange unit may be introduced into the second heat-exchange unit.

9. The heat pump system of claim 8, wherein the refrigerant having passed through at least one of the evaporator or the chiller is introduced into the second heat-exchange unit through the third refrigerant inlet.

10. The heat pump system of claim 1, further comprising:

a second connection line having a first end connected to the second expansion valve and having a second end connected to the refrigerant line between the internal condenser and the heat-exchanger;

a third expansion valve provided on the refrigerant line between the internal condenser and the heat-exchanger; and a third connection line having a first end connected to the third expansion valve and having a second end connected to the refrigerant line between the heat-exchanger and a sub-heat-exchanger.

11. The heat pump system of claim 10, wherein the heat-exchanger is configured to condensate or evaporate the refrigerant by exchanging heat with ambient air based on a selective operation of the third expansion valve.

12. The heat pump system of claim 10, wherein the second expansion valve and the third expansion valve are electronic expansion valves configured to selectively expand the refrigerant while controlling a flow of the supplied refrigerant.

13. The heat pump system of claim 1, further comprising an accumulator provided on the refrigerant line between the evaporator and the compressor.

14. The heat pump system of claim 1, wherein the heat-exchanger module is a plate heat-exchanger.

* * * * *